(12) United States Patent
Levy et al.

(10) Patent No.: US 10,681,431 B2
(45) Date of Patent: Jun. 9, 2020

(54) REAL-TIME INTERSTITIAL CONTENT RESOLUTION AND TRICK MODE RESTRICTIONS

(71) Applicant: Cisco Technology, Inc., San Jose, CA (US)

(72) Inventors: Thomas Levy, Paris (FR); Dan Ariel Elbert, Jerusalem (IL); Doron Tzur, Modiin (IL); Gilad Taub, Givat Zeev (IL); Keith Millar, West Sussex (GB)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 15/662,360

(22) Filed: Jul. 28, 2017

(65) Prior Publication Data

US 2018/0220202 A1    Aug. 2, 2018

Related U.S. Application Data

(60) Provisional application No. 62/453,560, filed on Feb. 2, 2017.

(51) Int. Cl.
| | |
|---|---|
| *H04N 21/845* | (2011.01) |
| *H04N 21/234* | (2011.01) |
| *H04N 21/2381* | (2011.01) |
| *H04N 21/6587* | (2011.01) |
| *H04N 21/472* | (2011.01) |
| *H04N 21/2343* | (2011.01) |

(52) U.S. Cl.
CPC ..... *H04N 21/8453* (2013.01); *H04N 21/2381* (2013.01); *H04N 21/23418* (2013.01); *H04N 21/23424* (2013.01); *H04N 21/234327* (2013.01); *H04N 21/47202* (2013.01); *H04N 21/6587* (2013.01); *H04N 21/8456* (2013.01)

(58) Field of Classification Search
CPC .................................................. H04N 21/8453
See application file for complete search history.

(56) References Cited

U.S. PATENT DOCUMENTS

| | | | |
|---|---|---|---|
| 9,479,801 B2 | 10/2016 | Higgs et al. | |
| 9,503,765 B2 | 11/2016 | Bjordammen et al. | |
| 2013/0311670 A1 | 11/2013 | Tarbox et al. | |
| 2014/0150019 A1 | 5/2014 | Ma et al. | |
| 2016/0044078 A1 | 2/2016 | Hosur | |
| 2016/0345074 A1* | 11/2016 | Serbest | H04N 21/812 |

* cited by examiner

*Primary Examiner* — Michael H Hong
(74) *Attorney, Agent, or Firm* — Merchant & Gould P.C.

(57) ABSTRACT

Server-side trick mode restrictions in a stream may be provided. The stream may comprise, for example, a Video on Demand (VOD) Adaptive Bitrate (ABR) stream. First, a playlist request corresponding to a stream may be received from a user device. Next, a current stream position in the stream may be determined. In response to receiving the playlist request and when the current stream position corresponds to a non-skip segment, a playlist may be created having a last chunk comprising a next chunk of the stream from the current stream position. The playlist may then be provided to the user device.

20 Claims, 10 Drawing Sheets

… (US 10,681,431 B2 — patent document)

REAL-TIME INTERSTITIAL CONTENT RESOLUTION AND TRICK MODE RESTRICTIONS

Under provisions of 35 U.S.C. § 119(e), Applicant claims the benefit of U.S. Provisional Application No. 62/453,560 filed Feb. 2, 2017, which is incorporated herein by reference.

TECHNICAL FIELD

The present disclosure relates generally to server-side trick mode restrictions and content insertion.

BACKGROUND

Adaptive bitrate (ABR) streaming is a technique used in streaming multimedia over computer networks. While in the past most video streaming technologies utilized streaming protocols such as Real-time Transport Protocol (RTP) with Real Time Streaming Protocol (RTSP) today's adaptive streaming technologies are almost exclusively based on Hypertext Transfer Protocol (HTTP) and designed to work efficiently over large distributed HTTP networks such as the Internet. Adaptive bitrate streaming works by detecting a user's bandwidth and Central Processing Unit (CPU) capacity in real time and adjusting the quality of a video stream accordingly. It uses an encoder which can encode a single source video at multiple bit rates. The player client switches between streaming the different encodings depending on available resources.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Server-side trick mode restrictions in a stream may be provided. The stream may comprise, for example, a Video on Demand (VOD) Adaptive Bitrate (ABR) stream. First, a playlist request corresponding to a stream may be received from a user device. Next, a current stream position in the stream may be determined. In response to receiving the playlist request and when the current stream position corresponds to a non-skip segment, a playlist may be created having a last chunk comprising a next chunk of the stream from the current stream position. The playlist may then be provided to the user device.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

ABR streaming may support two types of content, Video on Demand (VOD) and live video. VOD content streaming may be implemented in such a way that a full video of a VOD event may be available to a user at any moment. This level of availability may make it difficult to comply with some requirements of video content service providers. These difficult requirements may comprise, but are not limited to, requirements that require the content to be manipulated per user as the user consumes (i.e., watches) the content. For example, these requirements may comprise: i) insertion of interstitial content in the content in real time; and ii) prevention of the user from skipping over specific sections of the content (i.e., trick mode restrictions). Consistent with embodiments of the disclosure, dynamic interstitial content insertion (e.g., dynamic ad-insertion) may provide a solution where interstitial content may be inserted dynamically during the playback of a video stream (e.g., a VOD video stream). Interstitial content may comprise, but is not limited to, advertisements, legal notices, etc. Consistent with embodiments of the disclosure, inserted interstitial content may comprise any type content.

An interstitial content insertion proxy may transform a finite media playlist of a Video on Demand (VOD) content into a growing playlist that may be increased with new segments when a playback position reaches a position close to a next placement opportunity. When it needs to provide next segments that cross a placement opportunity, the interstitial content insertion proxy may trigger an interstitial content server to provide a decision for the next interstitial content.

Server-side insertion may be popular to better monetize VOD ABR content. One reason may be that server-side insertion (as compared to client side ad-insertion) may be safer against blocking. With conventional server-side insertion, the placement opportunities (i.e., position in the content where it may be appropriate to insert interstitial content—pre-roll, mid-roll, and post-roll) may be resolved in one step at session setup for example. For accounting purposes, the interstitial content impression (i.e., the display of the interstitial content on the user side) may need to be reported to an interstitial content provider by triggering, for example, a Hypertext Transfer Protocol (HTTP) Uniform Resource Locator (URL), to allow the video content service provider to be paid by an interstitial content provider.

Some video content service providers have determined that resolving interstitial content in advance may be a problem for some interstitial content providers. For example, some interstitial content providers may require that the interstitial content impression be reported close to its deployment to remain valid. Accordingly, embodiments of the disclosure may provide a server-side interstitial content insertion solution that may provide resolution of interstitial content inserted into, for example, a VOD ABR content close to its playback.

Furthermore, some video content service providers may have requirements to block trick mode functionality (e.g., in particular fast-forward) in certain segments (e.g., interstitial content inserted in a video stream), in order to make sure that the users watch these sections without being able to skip them. This problem may be more relevant for VOD content because the full video of the event may be available to the user at any moment, and the consumer can jump to any point in the video stream. For Live events, however, the users may have to watch the interstitial content before the actual video content broadcasting resumes. Consequently, embodiments of the disclosure may provide a solution for ABR clients without resorting, for example, to changes in protocols or proprietary signaling and proprietary client device implementation. Embodiments of the disclosure may provide a solution that may be server-side based in such a way that the client device may not be aware of it.

In conventional VOD ABR streaming, VOD content may be managed with a static media playlist that may not change during playback. For conventional VOD content, a video player application (e.g., a video player on a client device) may be given, for example, a URI of a manifest file from which it plays. The manifest may provide a list of alternative playlists that the video player may select in order to play a desired video. The playlists may be characterized by different bitrates, resolution, alternative renditions, etc. In addition, the playlists may contain a list of video chunks. The video player may retrieve the manifest file, select a playlist, load the playlist file, and start retrieving and playing video chunks (e.g., from a content distribution network (CDN) server).

On the other hand, there may be other types of media playlist (e.g., for a live content) that may be dynamic rather than static and that the video player may need to refresh regularly during playback. In other words, additional (i.e., new) media segments may be added (or removed) over time as they become available. In this example of live video, the video player may be responsible for periodically reloading and updating the playlist files in order to access the new media segments (e.g., video chunks).

Consistent with embodiments of the disclosure, the video player may retrieve the manifest and the playlists from a proxy (e.g., an ABR controller). The ABR controller may transform the manifest and the static media playlist of the VOD content into a dynamically growing playlist that may be grown overtime as new chunks are added when the playback position reaches a position close to a next manipulation point.

To enable the ABR controller to know when a new playlist should be authored and delivered, the ABR controller may understand where the video player's current play point (i.e., current stream position) is. This may be achieved in a number of different ways, for example, through: i) insertion of a dummy segment into the playlist where the URL is to the ABR controller along with a session Identifier and a position indicator; ii) routing selected chunks through the ABR controller, where the routed chunk is a decision point, and the ABR controller knows the maps the chunk request to a position on the stream; and iii) routing of segment requests through the ABR controller.

Figure 1:
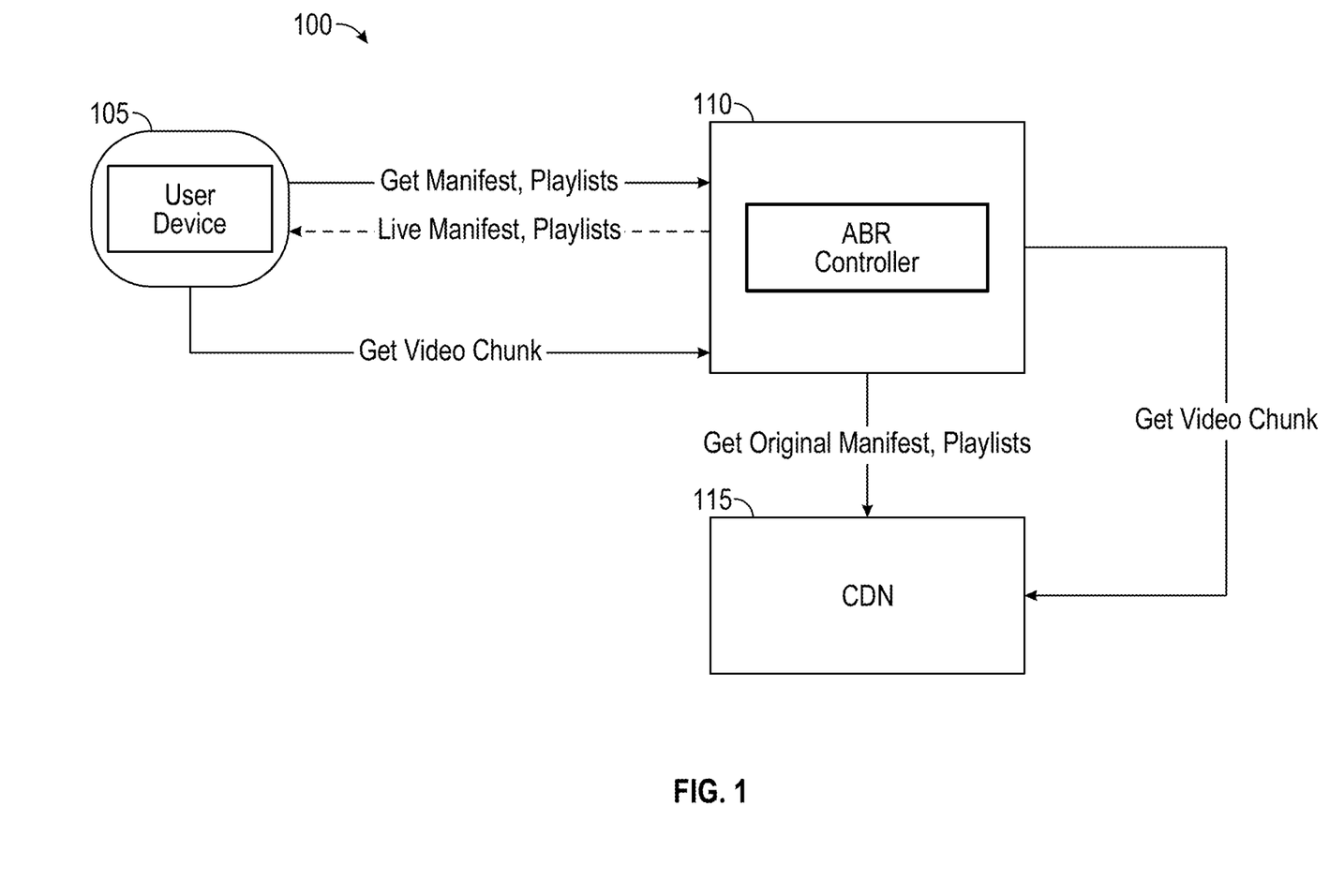
FIG. 1 is a block diagram of an interstitial content service system.

FIG. 1 is a block diagram of an interstitial content service system 100 consistent with embodiments of the disclosure. As shown in FIG. 1, content service system 100 may comprise a user device 105, an ABR Controller 110, and a content distribution network (CDN) server 115. Computing device 700, as described in greater detail below, may provide an operating environment for any of user device 105, ABR controller 110, and content distribution network (CDN) server 115.

User device 105 may comprise, but is not limited to, a tablet device, a mobile device, a smart phone, a telephone, a remote control device, a personal computer, a network computer, or other similar device. CDN server 115 may comprise a server in a CDN in a globally distributed network of servers deployed in multiple data centers. The CDN may serve content to users with high availability and high performance. CDNs may serve a large fraction of the Internet content, including web objects (text, graphics and scripts), downloadable objects (media files, software, documents), applications (e-commerce, portals), live streaming media, on-demand streaming media, and social networks.

In HTTP Live Streaming (HLS) protocol, a VOD playlist shall be indicated by having a tag EXT-X-PLAYLIST-TYPE with the value VOD. The value EVENT or the absence of the tag indicates changing playlists that may need to be reloaded. Accordingly, ABR controller 110 may convert the VOD playlists to Live (e.g., dynamic) playlists. ABR controller 110 may also act as a proxy to CDN server 115 when the video player on user device 105 may request the video chunks. ABR controller 110 may need to keep track of the video chunks played (i.e., play position or current stream position) by the video player on user device 105 in order to use this position as part of the decision making process. Consequently, conversion of VOD video to live video (e.g., as described above) may include manipulation of the playlists at real-time addressing server-side trick modes restrictions (e.g., using standard ABR players) and inserting/replacing existing content in real-time (e.g., during playback) of which addresses real-time interstitial content resolution.

Figure 2A:
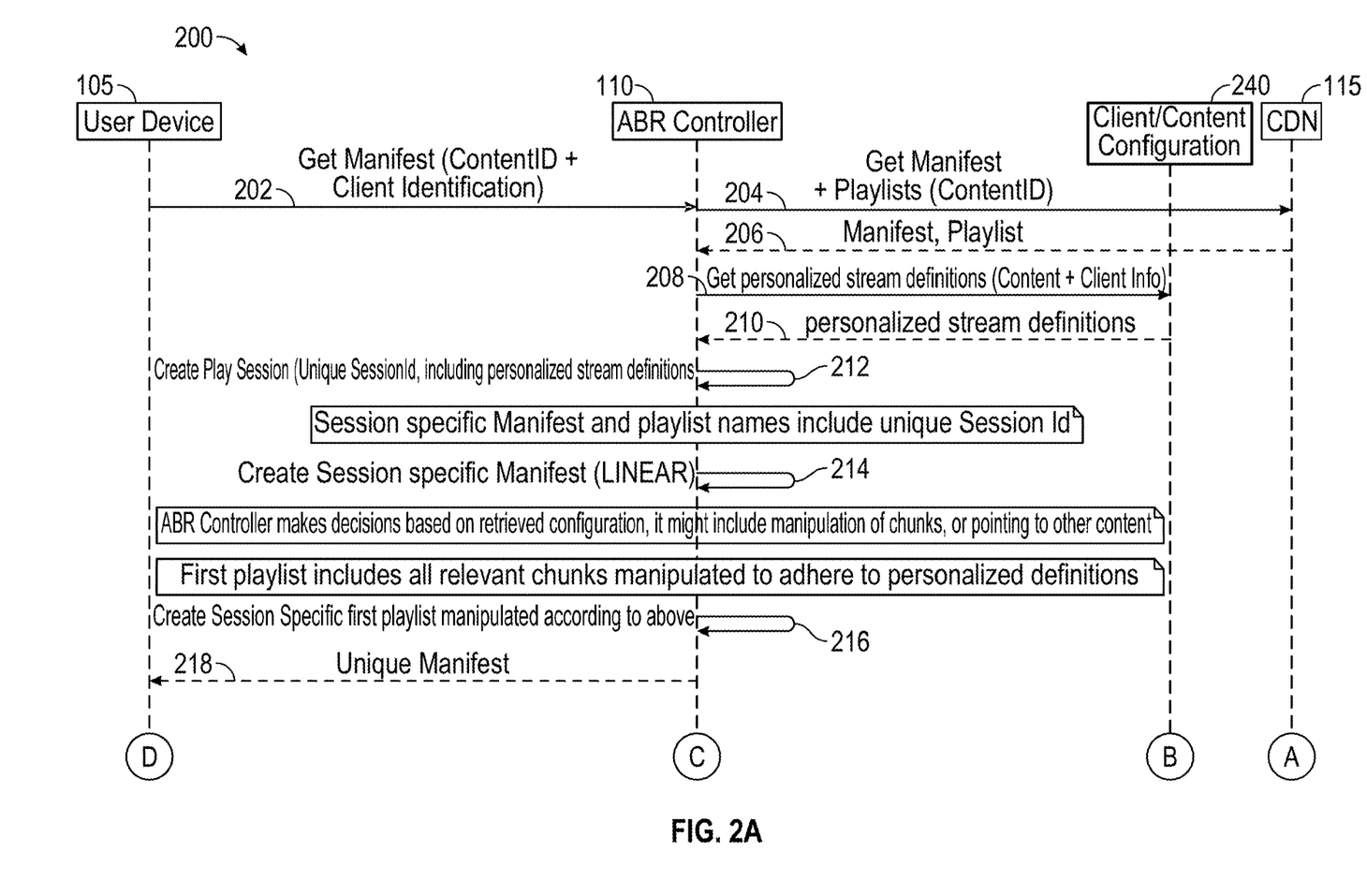
FIGS. 2A and 2B show a state diagram of VOD video to Live video in ABR streaming.
Figure 2B:
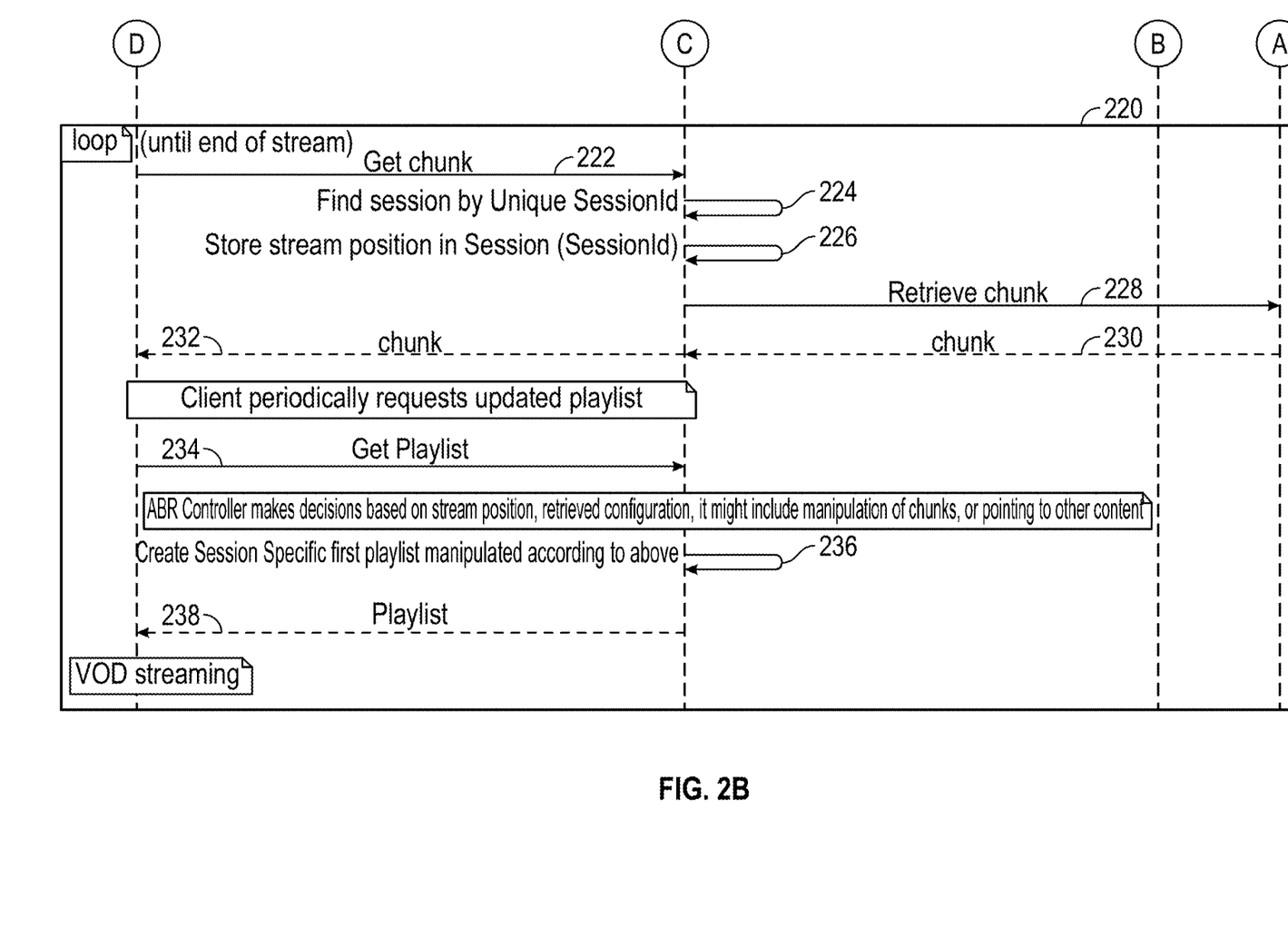

FIGS. 2A and 2B show a state diagram of VOD video to Live video in ABR streaming consistent with embodiments of the disclosure. As shown in FIGS. 2A and 2B, ABR controller 110 may convert static (VOD) to dynamic (LIVE) manifest/playlists, manage the different client sessions, and manipulate the manifest/playlists in real-time according to features that may be required by video content service providers for example.

As shown in FIGS. 2A and 2B, first, the video player on user device 105 may request a manifest and playlists for a VOD asset (stage 202). Next, ABR controller 110 may get the original VOD manifest and playlists from CDN server 115 (stages 204 and 206). ABR Controller 110 may then get relevant session specific (e.g., stream/client specific) configuration used to manipulate VOD streaming, for example, places where trick modes are restricted or places where other content (e.g., interstitial content (e.g., ads)) may need to be inserted (stages 208 and 210). This may be based on content information, client information, or any other business definition for example.

Next, ABR controller 110 may create a unique play session that may be used to manage the dynamic update of the playlists (stage 212). ABR controller 110 may then create a new manifest file (stage 214) that shall point to the session playlists and returned to the video player on user device 105 the first playlist (stage 216), which is a manipulation of the original asset playlist based on the session specific configuration and decision process (stage 218). As the video player on user device 105 is streaming (block 220), ABR controller 110 may store the last chunck played (stages 222, 224, 226, 228, 230, and 232). When the video player on user device 105 requests a new playlist (stage 234), ABR controller 110 may dynamically generate it (stage 236), based on the play position, session configuration, and decision process and may return it to the video player on user device 105 (stage 238).

Playlists content may be synchronized as required, for example, by ABR controller 110 (e.g., segment size, etc.). If the video player on user device 105 switches to an alternative playlist, ABR controller 110 may build it using the same process so playback may stay synchronized. Once the VOD asset playback is done, ABR controller 110 may release the session. ABR controller 110 may also have cleanup functionality if a session is not closed properly (e.g., if for a specific period of time, the video player does not request playlists/segments).

In order for ABR controller 110 to link the playlist request with video played by the video player on user device 105, a unique session identification (ID) may be used and passed by the video player on user device 105 on calls to ABR controller 110. Consistent with embodiments of the disclosure, there may be several options that may be used. For example, a unique tag per session may be appended by ABR controller 110 to the manifest file name, playlists name, and the video chunk names. This unique tag may be being signed in order to prevent hacking. Another example may be using the incoming Internet Protocol (IP) address of the request to associate a playlist request with a video chunk request. And yet another example may be adding an identifier to the URL of the playlist as a parameter.

Figure 3:
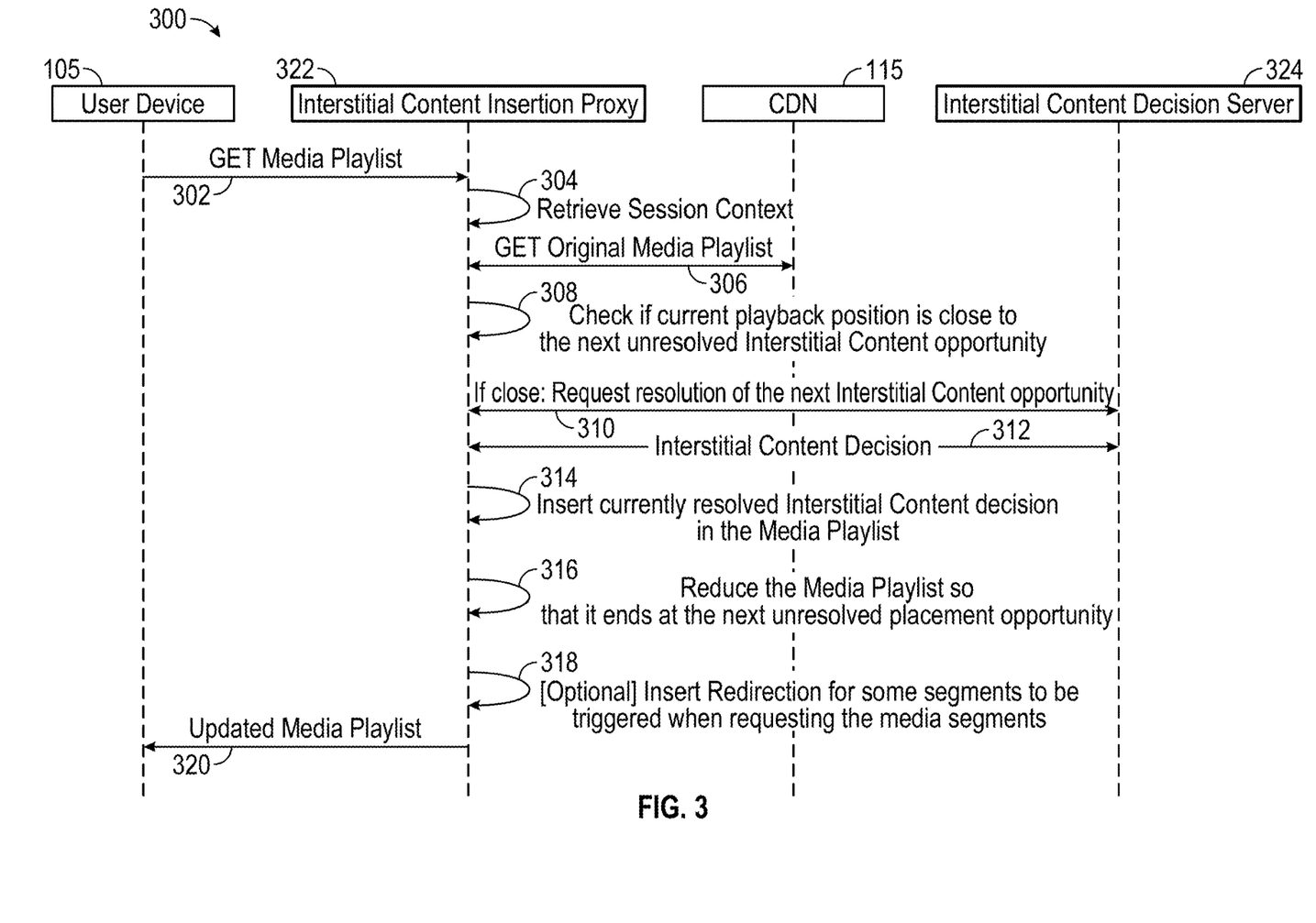
FIG. 3 shows a state diagram for providing real-time interstitial content (e.g., advertisement) resolution.

FIG. 3 shows a state diagram for providing real-time interstitial content (e.g., advertisement (i.e., ad)) resolution with ABR server-side interstitial content insertion. An interstitial content insertion proxy may be triggered at VOD session setup. The interstitial content insertion proxy may perform dynamic resolution of placement opportunities (i.e., position in the content where it may be appropriate to insert interstitial content (e.g., advertisement) pre, mid and post-roll)) in one stage using, for example, a standard protocol (e.g., VAST or SCTE) from an interstitial content decision server 322. Then, it may insert the resolved interstitial content into a finite ABR playlist that may be returned back to the video player on user device 105. The video player on user device 105 may then be able to play a VOD content with some personalized interstitial content that has been resolved at the time it requested the start of the playback.

Consistent with embodiments of the disclosure, the interstitial content insertion proxy may be extended with the functionality of the above ABR controller 110 to transform a finite media playlist of the VOD content into a growing playlist (e.g., an EVENT playlist) that may be increased with new segments when the playback position reaches a position close to the next placement opportunity. According to ABR standards (e.g., HTTP Live Streaming), the ABR player shall periodically reload the playlists for a playlist of type "EVENT" (in contrast to VOD).

The state diagram of FIG. 3 may apply for interstitial content insertion resolution in real-time. However, the same logic may also apply for other kind of resolution that would ideally need to occur in real-time (e.g., for doing real-time replacement of a part of a VOD content by another content).

Initially, the interstitial content insertion proxy (e.g., ABR controller 110) may be triggered at session setup to handle server-side interstitial content insertion for this VOD session playback. As a result of this, the interstitial content insertion proxy may update the ABR play URL by adding a session identifier in the URL and by adding itself in the URL path for example. This updated play URL may be given back to the video player on user device 105 and may ensure that the interstitial content insertion proxy may be triggered back for ABR playlist retrieval during the session playback.

As shown in the state diagram of FIG. 3, the interstitial content insertion proxy (e.g., ABR controller 110) may perform a process when the video player on user device 105 may periodically request the media playlist for the VOD content of a particular session. First, the interstitial content insertion proxy may retrieve a session context locally (e.g., using the session identifier that may be a part of the URL). The session context may include some information about the VOD content, the current playback position, and the interstitial content already resolved for the session (stages 302 and 304). Next, the interstitial content insertion proxy may retrieve the original media playlist (without interstitial content insertion) from CDN server 115 (stage 306). The original playlist at the CDN level may be a finite playlist. Then the interstitial content insertion proxy may check to see if the current playback position is close to the next unresolved interstitial content opportunity in the media playlist (stage 308). If the current playback position is close, the interstitial content insertion proxy may trigger interstitial content decision server 322 to provide a decision for the next interstitial content (stage 310 and 312). The interstitial content insertion proxy may then insert the resolved interstitial content into the original playlist (stage 314). The interstitial content insertion proxy may reduce the media playlist so that it may end at the next unresolved placement opportunity (stage 316).

Optionally, the interstitial content insertion proxy (e.g., ABR controller 110) may also update some segments URL in the media playlist. This may be done so that the interstitial content insertion proxy may be triggered when the video player on user device 105 requests the media segments (rather than directly from CDN server 115). This may allow updating the current playback position in the session context (stage 318). Then the interstitial content insertion proxy may return the updated media playlist to the video player on user device 105 (stage 320). In parallel, the video player on user device 105 may request the media segments signaled in the media playlist during the video playback.

Figure 4A:
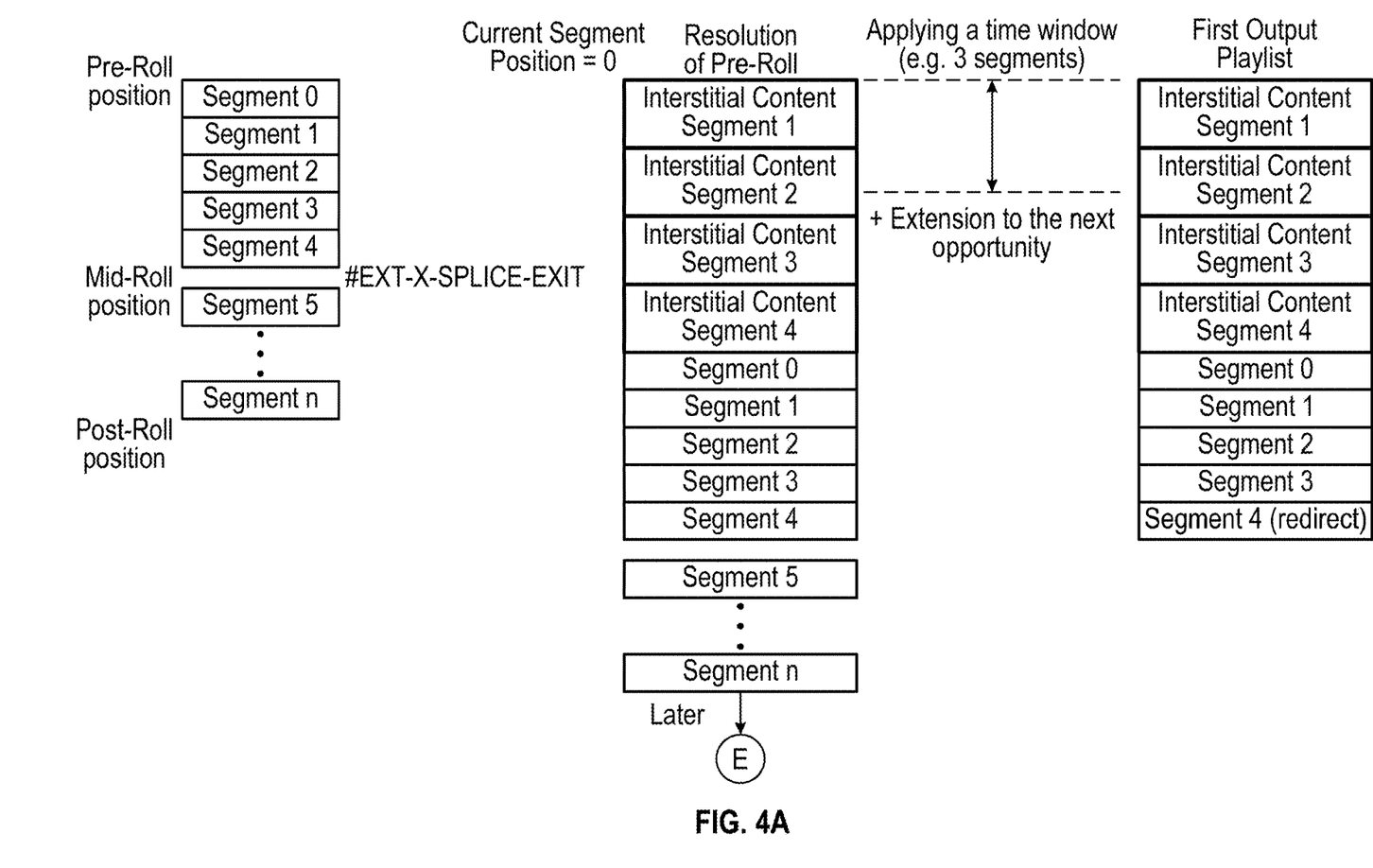
FIGS. 4A and 4B show an example of a transformation of the media playlist done by an interstitial content insertion proxy.
Figure 4B:
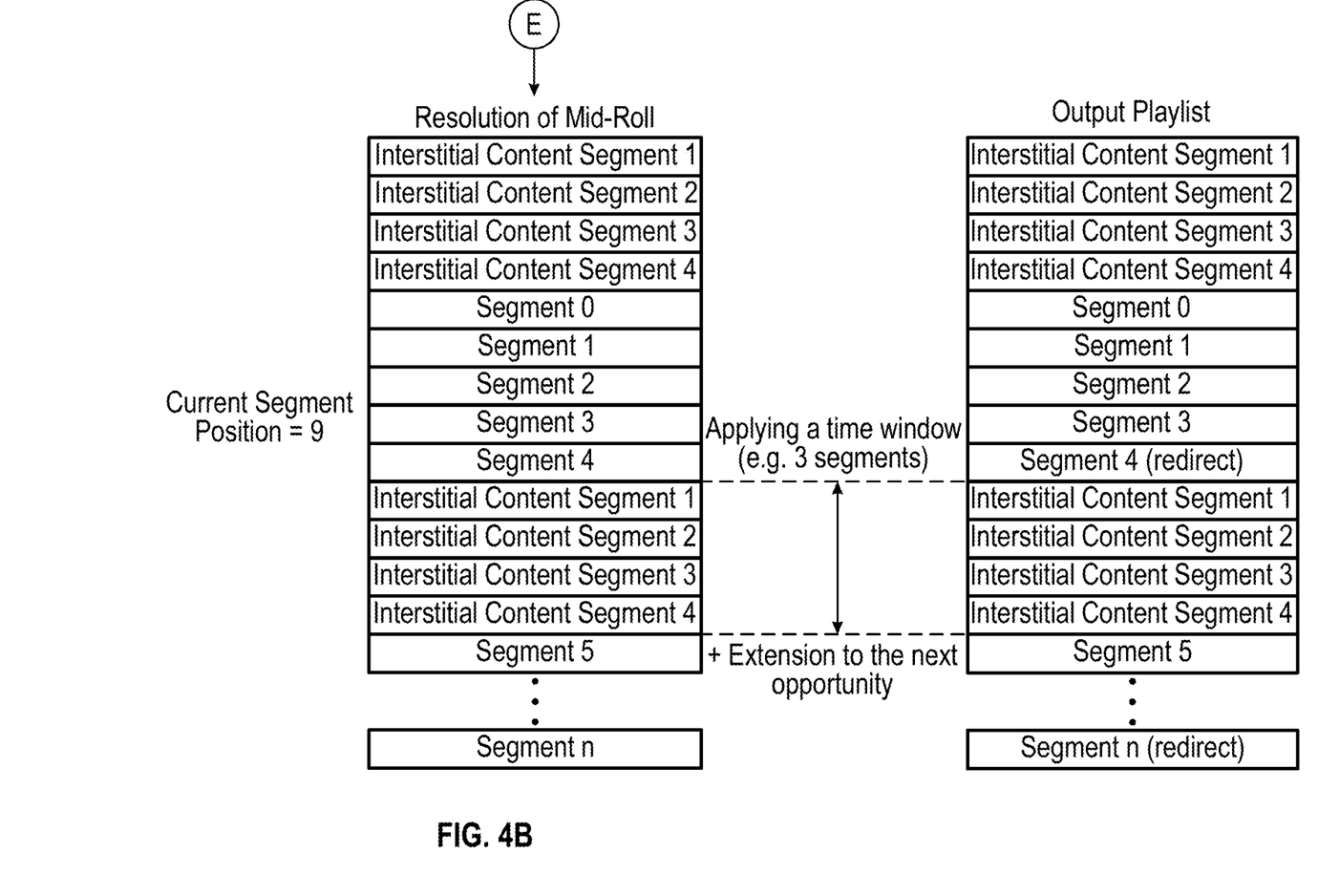

FIGS. 4A and 4B show an example of transformation of the media playlist done by the interstitial content insertion proxy. The output playlist may evolve with the current segment position that may reflect a current playback position (at the video player on user device 105 side). Consistent with embodiments of the disclosure as described above with respect to FIG. 3, ABR controller 110 may receive a playlist request corresponding to a stream. The stream may comprise a VOD stream being consumed by user device 105. Next, ABR controller 110 may determine a current stream position in the stream and ABR controller 110 may determine that the current stream position in the stream is close to a next unresolved interstitial content opportunity position. In response to determining that the current stream position in the stream is close to the next unresolved interstitial content opportunity position, ABR controller 110 may create a playlist having interstitial content inserted at the next unresolved interstitial content opportunity position. Then ABR controller 110 may provide the playlist to user device 105.

Figure 5A:
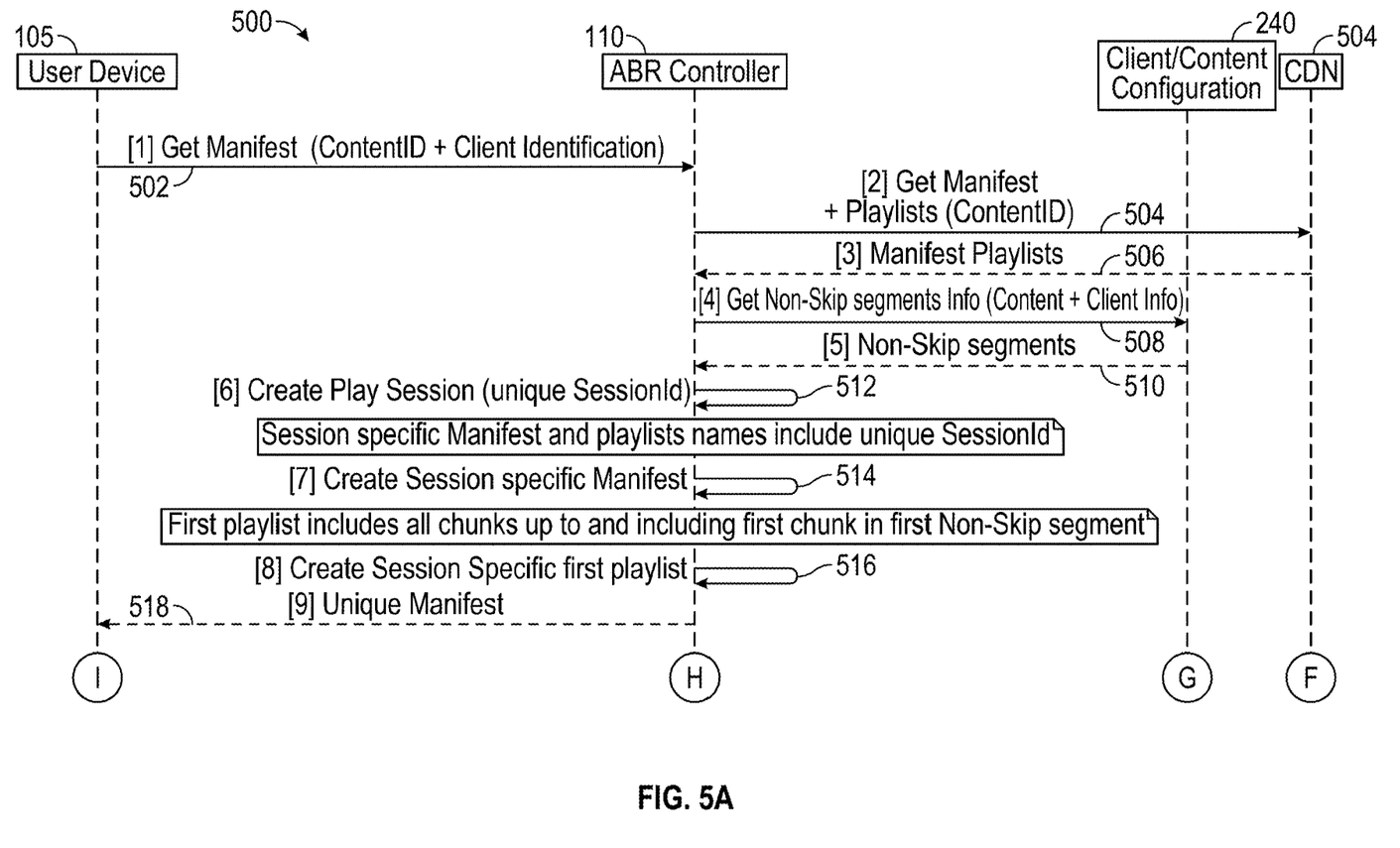
FIGS. 5A and 5B show a state diagram for providing server-side trick mode restrictions in VOD adaptive bitrate streaming.
Figure 5B:
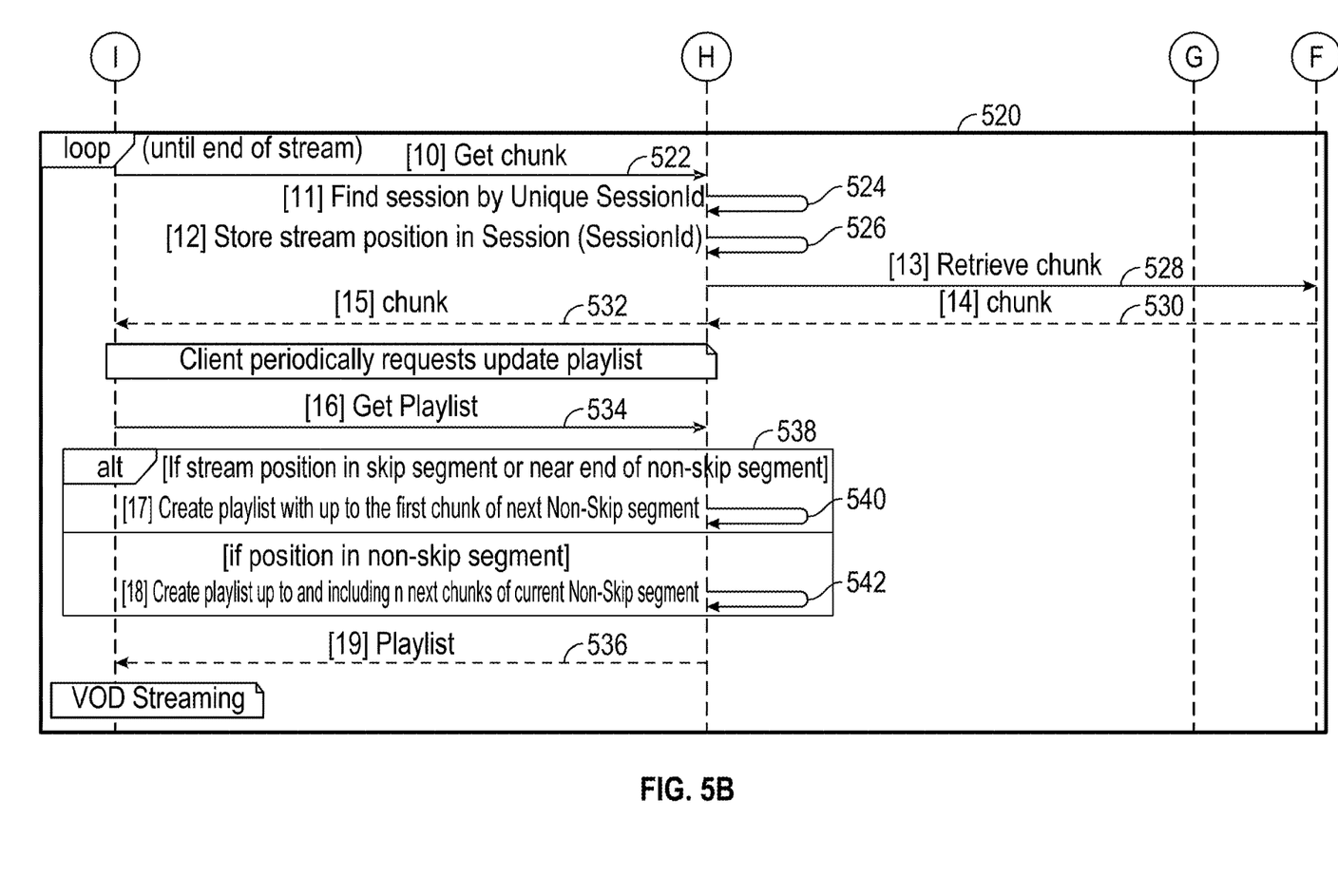

FIGS. 5A and 5B shows a state diagram for providing server-side trick mode restrictions in VOD adaptive bitrate streaming. Embodiments of the disclosure may prevent the user from skipping or playing faster than normal over predetermined segments of the video (i.e., "non-skip" segments that may correspond, for example, to interstitial content). This may be achieved in the following way. First, ABR controller 110 may be preconfigured with information about the location of the non-skip segments. Then the video player on user device 105 may request the manifest and playlists for this event (stage 502). In stages 504, 506, 508, and 510, ABR controller 110 may communicate with CDN 115 to obtain information in order to create the manifest and first playlist. ABR controller 110 may than then create a play session (stage 512), the manifest (stage 514), and first playlist (stage 516.) The manifest (and first playlist) may be sent by ABR controller 110 to the video player on user device 105 (stage 518).

Next, ABR controller 110 may generate Live playlists that may include the video segments up to and including the first chunk in the first non-skip segment (block 520). The video player on user device 105 may play any of the chunks, and can skip them. ABR controller 110 may keep track of the chunks retrieved by the video player on user device 105, in a particular playback session (stages 522, 524, 526, 528, 530, and 532).

During streaming, the video player on user device 105 may periodically request (stage 534) an update of the playlist (as specified by the ABR standard). ABR controller 110 shall not update the playlist until the first chunk of the non-skip segment is retrieved in order to prevent user from skipping the non-skip segment. Once created, the update of the playlist may be sent by ABR controller 110 to the video player on user device 105 (stage 536).

Block 538 illustrates how the playlist may be updated. As shown in stages 540 and 542, once the first non-skip segment is retrieved by the video player on user device 105, ABR controller 110 may update the playlist in such a way that a new non-skip chunk is added to allow normal playback over the non-skip segment. In this way, it may not be not possible for the video player on user device 105 to skip over or play trick modes over the non-skip segment. Note that "n" chunks may be added, "n" being the number of chunks that may be needed to allow the player to play smoothly. Only playback at live rate is possible. After the last chunk of the non-skip segment may be retrieved, ABR Controller 110 may add to the playlist the additional video chunks until the next non-skip segment. In this way, user device 105 may again be able to use trick modes in the VOD content. The stages of block 520 may be repeated until the end of the content. When no more non-skip segments are present, ABR controller 110 may add an indication to the playlist (in HLS this is achieved by adding an EXT-X-ENDLIST tag).

Figure 6:
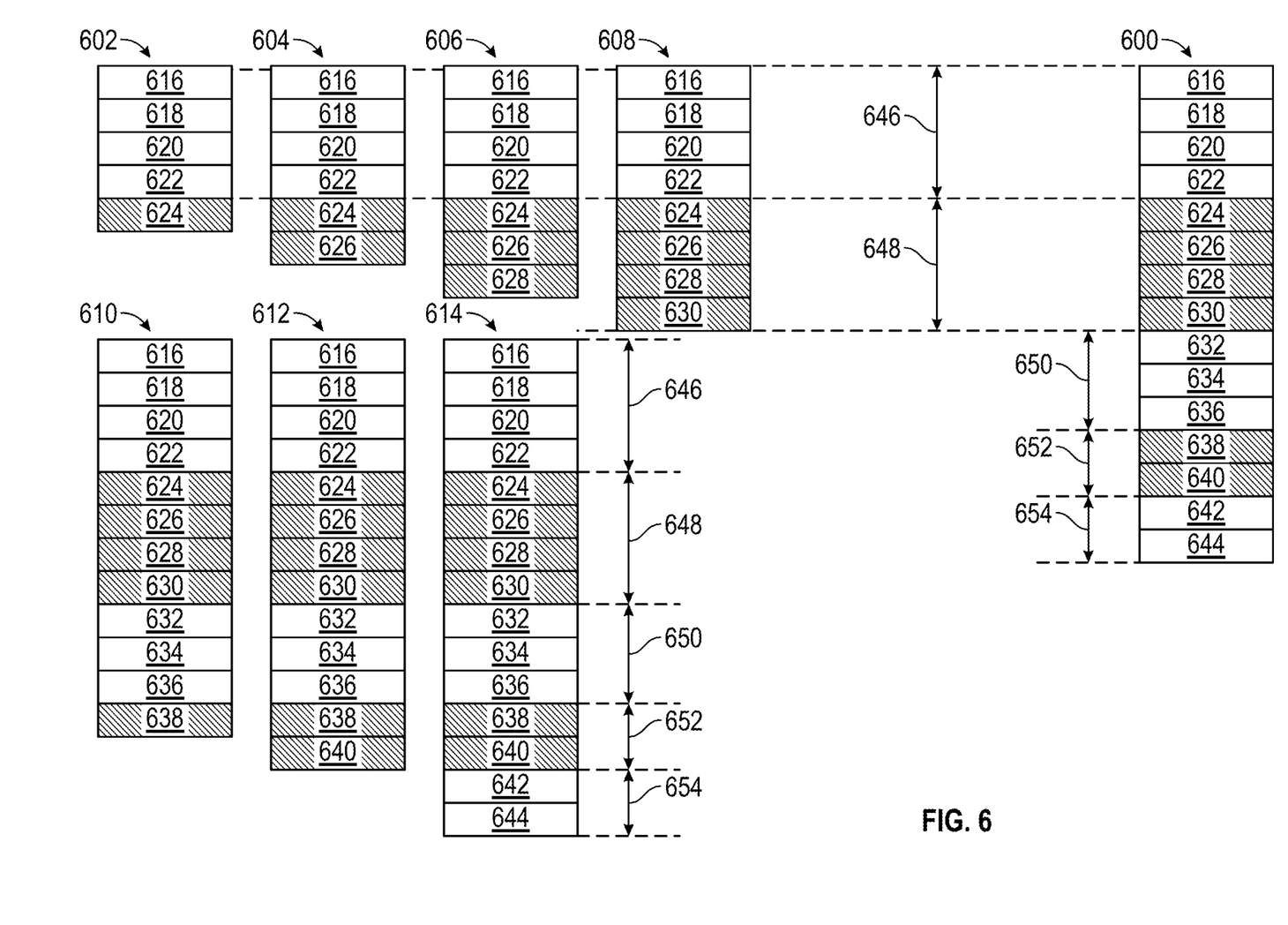
FIG. 6 shows an example of how a playlists may be generated during playback.

FIG. 6 shows an example of how playlists may be generated during playback (e.g., VOD playback) as described above with respect to FIGS. 5A and 5B. As shown in FIG. 6, a complete playlist 600 may be progressively generated by ABR Controller 110 as user device 105 consumes the content. Playlist 600 may be progressively generated as a first play list 602, a second playlist 604, a third playlist 606, a fourth playlist 608, a fifth playlist 610, a sixth playlist 612, and a seventh playlist 614. The playlists of FIG. 6 may comprise a first chunk 616, a second chunk 618, a third chunk 620, a fourth chunk 622, a fifth chunk 624, a sixth chunk 626, a seventh chunk 628, an eighth chunk 630, a ninth chunk 632, a tenth chunk 634, an eleventh chunk 636, a twelfth chunk 638, a thirteenth chunk 640, a fourteenth chunk 642, and a fifteenth chunk 644. Furthermore, the playlists of FIG. 6 may comprise a first skip segment 646 (e.g., first chunk 616, second chunk 618, third chunk 620, and fourth chunk 622), a first non-skip segment 648 (e.g., fifth chunk 624, sixth chunk 626, seventh chunk 628, and eighth chunk 630), a second skip segment 650 (ninth chunk 632, tenth chunk 634, and eleventh chunk 636), a second non-skip segment 652 (e.g., twelfth chunk 638 and thirteenth chunk 640), and a third skip segment 654 (e.g., fourteenth chunk 642 and fifteenth chunk 644). A last chunk for the playlists may comprise the chunk at the bottom of the corresponding playlist.

Consistent with embodiments of the disclosure as described above with respect to FIGS. 5A and 5B, ABR controller 110 may receive a playlist request from user device 105 corresponding to a stream. The stream may comprise a VOD stream being consumed by user device 105. Next, ABR controller 110 may determine a current stream position in the stream. In response to receiving the playlist request and when the current stream position corresponds to a non-skip segment (e.g., first non-skip segment 648 or second non-skip segment 652), ABR controller 110 may create a playlist having a last chunk comprising a next chunk of the stream from the current stream position. For example: i) if the current stream position corresponds to fifth chunk 624, ABR controller 110 may create second playlist 604; ii) if the current stream position corresponds to sixth chunk 626, ABR controller 110 may create third playlist 606; iii) if the current stream position corresponds to seventh chunk 628, ABR controller 110 may create fourth playlist 608; and iv) if the current stream position corresponds to twelfth chunk 638, ABR controller 110 may create sixth playlist 612. ABR controller 110 may then provide the playlist to user device 105.

Consistent with embodiments of the disclosure as described above with respect to FIGS. 5A and 5B, ABR controller 110 may receive a playlist request from user device 105 corresponding to a stream. The stream may comprise a VOD stream being consumed by user device 105. Next, ABR controller 110 may determine a current stream position in the stream. In response to receiving the playlist request and when the current stream position corresponds to a skip segment (e.g., first skip segment 646, second skip segment 650, or third skip segment 654), ABR controller 110 may a create playlist having chunks between the current stream position and an end of the skip segment and a first chunk of a non-skip segment after the skip segment. For example: i) if the current stream position corresponds to first skip segment 646, ABR controller 110 may create first playlist 602; and ii) if the current stream position corresponds to second skip segment 650, ABR controller 110 may create fifth second playlist 610. ABR controller 110 may then provide the playlist to user device 105. Note that it may also be possible to cut the beginning of the playlist, for example, if we want to block skipping of the segments also in rewind.

Figure 7:
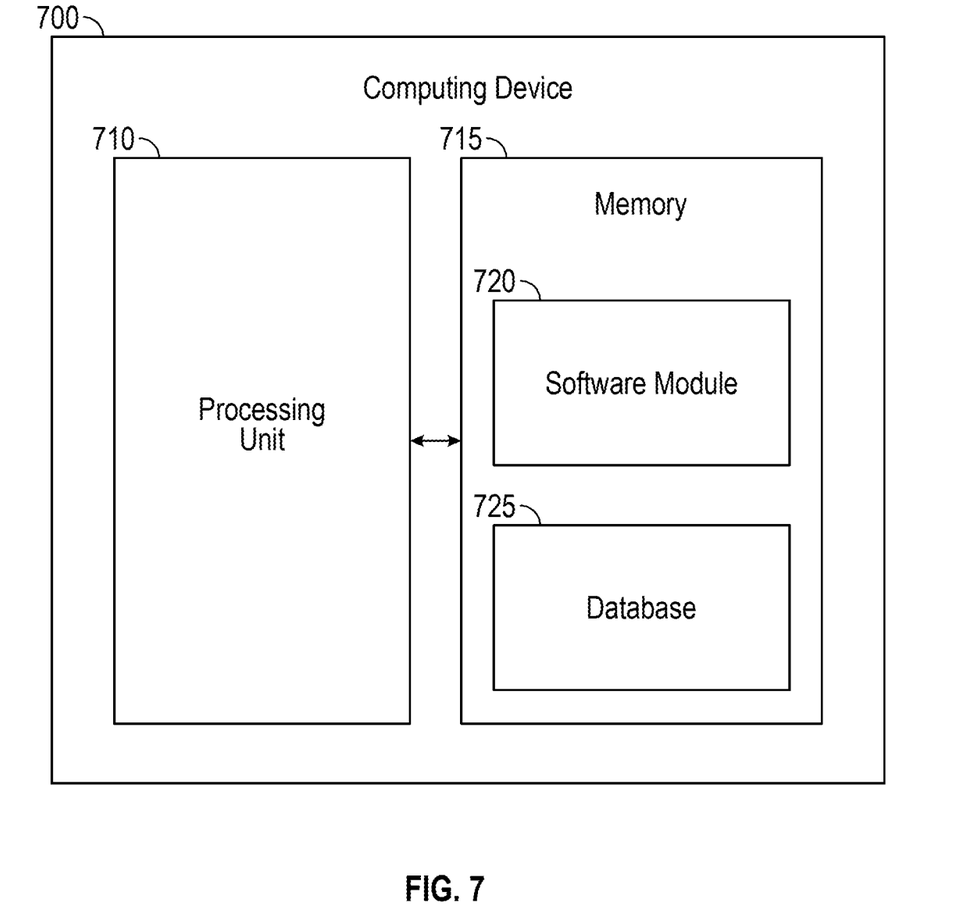
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform the processes described above with respect to FIG. 2A, FIG. 2B, FIG. 3, FIG. 4A, FIG. 4B, FIG. 5A, FIG. 5B, and FIG. 6. Computing device 700, for example, may provide an operating environment for user device 105, ABR controller 110, and CDN server 115 of FIG. 1. User device 105, ABR Controller 110, and CDN server 115 may operate in other environments and are not limited to computing device 700.

Computing device 700 may be implemented using a personal computer, a network computer, a mainframe, a router, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where some or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a playlist request corresponding to a stream;
   determining a current stream position in the stream;
   determining that the current stream position corresponds to a non-skip segment of the stream;
   creating, in response to receiving the playlist request and in response to determining that the current stream position corresponds to the non-skip segment, a playlist having a last chunk, the last chunk of the playlist comprising a next chunk of the stream from the current stream position; and
   providing the playlist.

2. The method of claim 1, wherein receiving the playlist request corresponding to the stream comprises receiving the playlist request corresponding to the stream comprising an Adaptive bitrate (ABR) stream.

3. The method of claim 1, wherein receiving the playlist request corresponding to the stream comprises receiving the playlist request corresponding to the stream comprising a Video on Demand (VOD) stream.

4. The method of claim 1, wherein receiving the playlist request corresponding to the stream comprises receiving the playlist request comprising one of a plurality of playlist requests received from a user device.

5. The method of claim 1, wherein determining the current stream position in the stream comprises determining the current stream position in the stream from information received from a user device consuming the stream.

6. The method of claim 1, wherein creating, in response to receiving the playlist request and when the current stream position corresponds to the non-skip segment, comprises creating, in response to receiving the playlist request and when the current stream position corresponds to the non-skip segment corresponding to interstitial content inserted into the stream.

7. The method of claim 1, wherein providing the playlist comprises providing the playlist to a user device that is consuming the stream.

8. A method comprising:
receiving a playlist request corresponding to a stream;
determining a current stream position in the stream;
determining that the current stream position corresponds to a skip segment of the stream;
creating, in response to receiving the playlist request and in response to determining that the current stream position corresponds to the skip segment, a playlist comprising all chunks between the current stream position and an end of the skip segment, the playlist further comprising a first chunk of a non-skip segment immediately after the skip segment; and
providing the playlist.

9. The method of claim 8, wherein receiving the playlist request corresponding to the stream comprises receiving the playlist request corresponding to the stream comprising an Adaptive bitrate (ABR) stream.

10. The method of claim 8, wherein receiving the playlist request corresponding to the stream comprises receiving the playlist request corresponding to the stream comprising a Video on Demand (VOD) stream.

11. The method of claim 8, wherein receiving the playlist request corresponding to the stream comprises receiving the playlist request comprising one of a plurality of playlist requests received from a user device.

12. The method of claim 8, wherein determining the current stream position in the stream comprises determining the current stream position in the stream from information received from a user device consuming the stream.

13. The method of claim 8, wherein creating the playlist having chunks between the current stream position and the end of the skip segment and the first chunk of the non-skip segment after the skip segment comprises creating the playlist wherein the non-skip segment corresponds to interstitial content inserted into the stream.

14. The method of claim 8, wherein providing the playlist comprises providing the playlist to a user device that is consuming the stream.

15. A method comprising:
receiving a playlist request corresponding to a stream;
determining a current stream position in the stream;
determining that the current stream position in the stream is within a predetermined number of segments of a next unresolved interstitial content opportunity position;
creating, in response to determining that the current stream position in the stream is within the predetermined number of segments of the next unresolved interstitial content opportunity position, a playlist having interstitial content inserted at the next unresolved interstitial content opportunity position; and
providing the playlist.

16. The method of claim 15, wherein receiving the playlist request corresponding to the stream comprises receiving the playlist request corresponding to the stream comprising an Adaptive bitrate (ABR) stream.

17. The method of claim 15, wherein receiving the playlist request corresponding to the stream comprises receiving the playlist request corresponding to the stream comprising a Video on Demand (VOD) stream.

18. The method of claim 15, wherein receiving the playlist request corresponding to the stream comprises receiving the playlist request comprising one of a plurality of playlist requests received from a user device.

19. The method of claim 15, wherein determining the current stream position in the stream comprises determining the current stream position in the stream from information received from a user device consuming the stream.

20. The method of claim 15, further comprising creating an alternate playlist that is synchronized with the playlist.

* * * * *